Jan. 1, 1957  J. SONTAG  2,775,962
ENGINE STARTING MEANS
Filed March 31, 1951  6 Sheets-Sheet 1

INVENTOR.
Joseph Sontag
BY
Louis Sheldon
Attorney

Jan. 1, 1957  J. SONTAG  2,775,962
ENGINE STARTING MEANS
Filed March 31, 1951  6 Sheets-Sheet 2

INVENTOR.
Joseph Sontag
BY Louis Sheldon
Attorney

Jan. 1, 1957   J. SONTAG   2,775,962
ENGINE STARTING MEANS
Filed March 31, 1951   6 Sheets-Sheet 5

INVENTOR.
Joseph Sontag
BY
Louis Sheldon
Attorney

Jan. 1, 1957  J. SONTAG  2,775,962
ENGINE STARTING MEANS
Filed March 31, 1951  6 Sheets-Sheet 6

INVENTOR.
Joseph Sontag
BY
Louis Sheldon
Attorney

United States Patent Office 2,775,962
Patented Jan. 1, 1957

2,775,962

ENGINE STARTING MEANS

Joseph Sontag, Chicago, Ill.

Application March 31, 1951, Serial No. 218,627

13 Claims. (Cl. 123—179)

This invention relates to carburetors and involves among other things improvements in the subject matter of my co-pending application Serial No. 585,847, filed March 31, 1945, entitled "Fuel Oil Carburetor Burner," patented November 4, 1952, No. 2,616,492.

An object of my invention is to provide a carburetor for producing an explosive mixture from crude oils, kerosene, distillates or any heavy liquid fuels for combustion in an internal combustion engine.

Another object is to provide a carburetor for producing an explosive mixture from gasoline, alcohol or other light liquid fuel as well as from heavy liquid fuel.

A further object is the provision of a carburetor for atomizing a heavy liquid fuel and then converting the atomized fuel into a vapor which is or approximates a gas and mixing the vapor with the proper quantity of air to effectively operate an engine when the mixture is ignited.

A still further object is the provision of a carburetor in which heavy liquid fuel is burned to furnish heat for atomizing additional heavy liquid fuel in the carburetor and for mixing the products of such burning with such atomized additional fuel for combustion in the engine.

Another object is the provision of a carburetor in which a relatively small quantity of heavy liquid fuel is burned to furnish heat requisite for atomizing a relatively large quantity of heavy liquid fuel in the carburetor and for mixing the products of such burning with such atomized additional fuel for combustion in the engine.

A still further object is to provide a carburetor with a fuel heating burner adapted to be ignited within a few seconds after the ignition switch is closed.

An additional object is to provide a carburetor with a fuel heating burner whose flame is automatically created when the engine starts to turn over and is automatically extinguished when the engine stops.

It is a further object to provide a carburetor in which fuel is burned to provide heat for vaporizing additional fuel destined for combustion in the engine and to produce water moisture and commingle the same with the vaporized fuel and air to serve as a catalyst for promoting efficiency of combustion of the air-fuel mixture.

An additional object is to provide a carburetor in which fuel is burned to provide heat for vaporizing additional fuel destined for combustion in the engine and for producing carbon dioxide and commingling the same with the vaporized fuel and air to serve as a knock-suppressor in the engine operated by the air-fuel mixture.

It is also an object to provide a carburetor having means for producing carbon dioxide and mixing the same with the fuel destined for combustion in the engine to serve as a knock-suppressor.

A further object is to provide a carburetor for producing a combustible mixture which will burn substantially completely in the engine so that there will be substantially no carbon deposit.

It is an additional object to provide a carburetor in which heavy liquid fuel to be burned in an engine is preheated by additional heavy liquid fuel to a vaporized state.

A still further object is to provide means for inhibiting the production of free carbon incident to the burning of heavy fuel oil in an automobile engine or other relatively high compression engine.

Another object involves the provision of a carburetor having fuel heating means set into operation by the closing of the starter switch and continuing in operation after the starter switch is opened.

A further object is to provide a heavy liquid fuel carburetor in which there is no drain on the battery for heating the fuel after the engine starter switch is opened.

Further objects and advantages of my invention will appear as the description proceeds.

The invention will be better understood upon reference to the following description and accompanying drawings, in which.

Referring now more particularly to the drawings, I have shown at 30 generally a carburetor embodying features of my invention and including a body 32 to which are secured at 34 a base 36 and at 38 a top 40, suitable gaskets 42 being interposed, and a float chamber 44 connected by screws 46 to the base. The base 36 has an inlet 48 (Fig. 5) receiving heavy liquid fuel 50 from the float chamber 44 through an outlet 52 in the latter and a communicating hole 54 in the intervening sealing gasket sleeve 56.

A vertical passage 60 in the base 36 conducts the fuel 50 from the inlet 48 to an annular channel 62 formed in an upper portion of the base, said channel being sealed at the top as by an annular plug 64. Another vertical passage 66 in the base 36 conducts fuel 50 from the channel 62 to a duct 68 in a tubular arm 69 which extends substantially radially inward from the base and conducts the fuel to a central vertical jet 70 threaded at 72 or otherwise suitably secured to said arm, a gasket 74 being disposed therebetween, the rate of fuel feed to the duct 68 being controlled by a needle valve 76. The preferably converged upper end 78 of the jet 70 is disposed centrally in the throat 80 of a vertical Venturi tube 82, and has a series of discharge ports 84 disposed preferably in the zone of greatest stricture of the throat.

A truncated preferably thin hollow vaporizing and dispersion cone 90 of metal of high heat conductivity, such as stainless steel, is force-fitted or otherwise securely fastened to the upper part of the jet 70 just below the lowest hole 84 and disposed with its apex 91 uppermost and flaring downwardly and outwardly and spaced preferably substantially uniformly from although in close proximity to the discharge end portion 92 of the Venturi tube 82. The bottom 96 of the cone 90 is open and underlies the Venturi tube 82 and may terminate in an upwardly projecting flange 98 laterally beyond the Venturi tube and spaced radially from an upstanding tubular wall extension 100 of the base 36.

The base wall 100 is spaced radially inward from and may extend to substantially the same height as a second annular wall 102 integral with the base 36 and having ribs 104 and an annular inwardly projecting ledge 106. A double-walled shell or sleeve 108 closed at the top 110 has an inner wall 112 force-fitted about and thereby supporting the Venturi tube 82, and an outer wall 114 force-fitted to the ribs 104 and seated on the ledge 106.

The base 36 has an additional vertical passage 120 leading from the inlet 52 and communicating with a lateral passage 122, flow to which is controlled by a needle valve 124. The passage 122 leads to a vertical passage 126 and to the bottom 128 of an annular upwardly open socket 130 in the outer wall 102 of the base 36. Securely fitted in the socket 130 is a burner generally indicated at 131. The burner 131 comprises an annular upwardly open channel 132 which may be made suitably of a heat resistant ceramic or, as shown, of metal 134 coated throughout with a porcelain or other ceramic or other heat resistant and electric insulation material 136, the web 138 of the channel having an annular series of holes 140 whereby liquid fuel in the socket bottom 128 may gain access to the interior of the channel.

Figures 16, 17, 18, 19, 20:
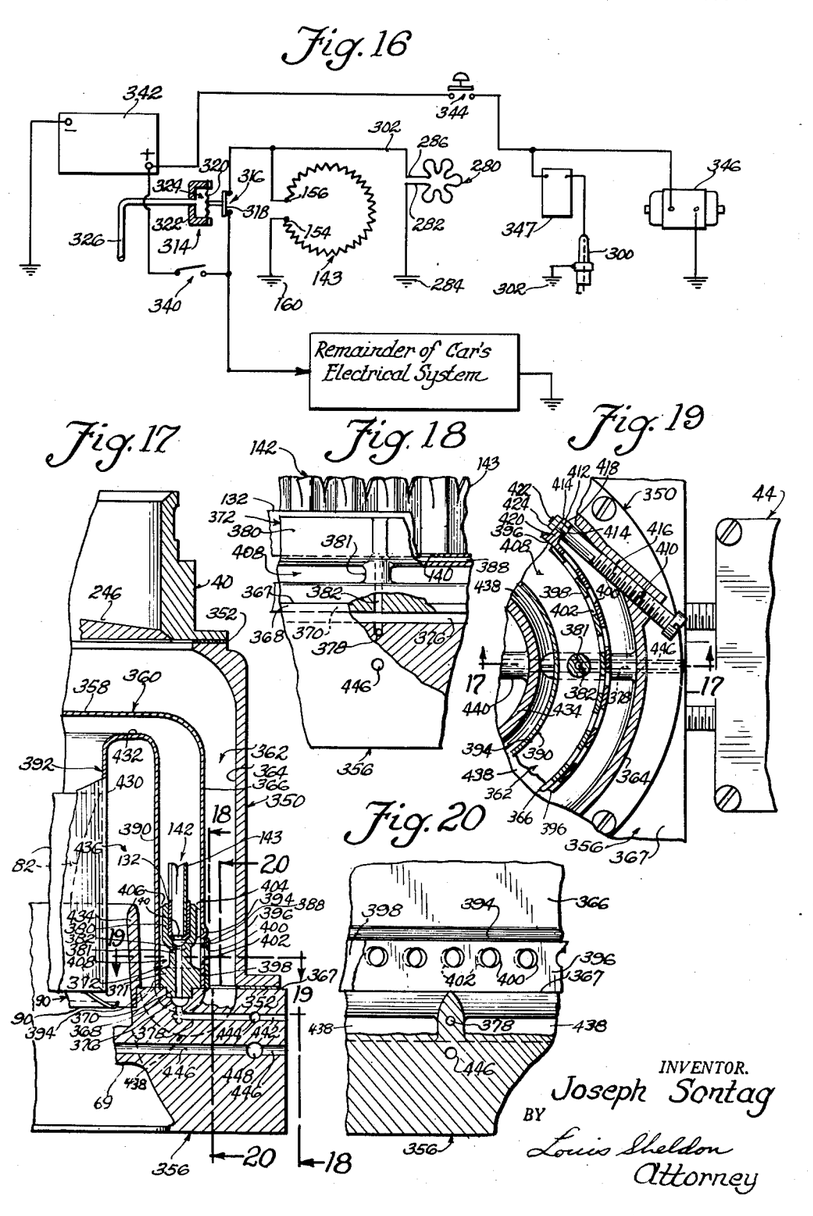
Fig. 16 is a circuit diagram of the electrical system of the carburetor and certain of the cooperating and associated parts of an internal combustion engine.
Fig. 17 is a fragmentary vertical sectional view of a modification, taken as indicated by the line 17—17 in Fig. 19, the float chamber being omitted.
Figs. 18, 19 and 20 are fragmentary sectional views taken as indicated by the lines 18—18, 19—19 and 20—20, respectively, in Fig. 17, the float chamber being shown in Fig. 19.
Figure 21:
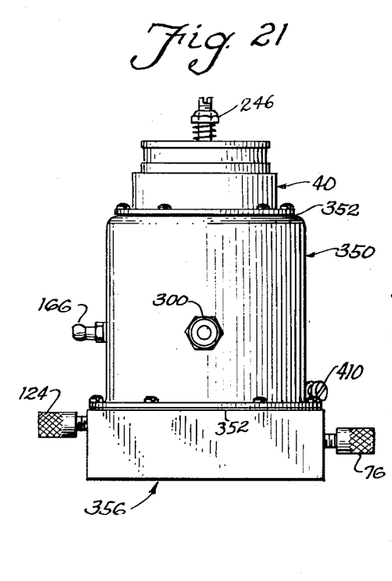
Fig. 21 is an elevational view of the device shown in Figs. 17 to 20.
Figure 22:
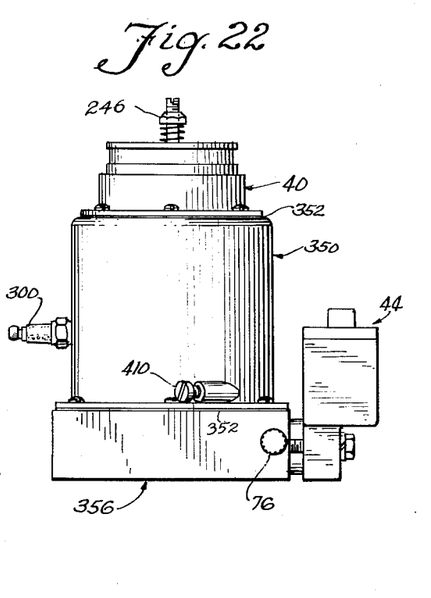
Fig. 22 is an elevational view of Fig. 21 as seen from the right thereof.
Figure 23:
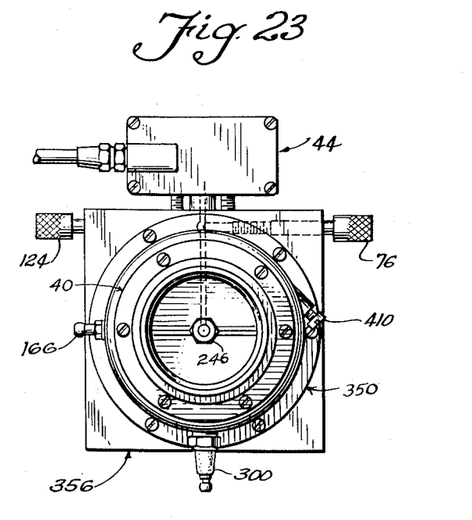
Fig. 23 is a top plan view of Fig. 21.

Seated within the channel 132 is a burner element 142 preferably in the form of a thin metal ribbon split ring 143 of high heat conductivity and electrical resistance characteristics, made for example of a nickel chromium steel, one such alloy being known as Nichrome, having terminal eyes 144 and 145 and projecting a substantial distance above the top 146 of the channel and formed with vertical corrugations 147 to provide added length and to provide additionally a plurality of lines of yielding spring contact with the respective inner side wall faces 148 of the channel so that the ribbon will be firmly held in place frictionally by the channel. The ribbon 143 preferably has a series of vertical top marginal tongues 150 which are twisted to impart to the top of the ribbon an interrupted generally zig-zag shape, for a purpose which will appear. The thickness of the ribbon 143 is substantially less than the diameter of each of the channel holes 140 so that the passage of fuel 50 from said holes upward into the channel 132 will not be substantially restricted by the ribbon. The top 152 of each of the eyes 144 and 145 may be flared to facilitate the introduction of terminal posts 154 and 156 which are tightly clasped by the eyes. The post 154 is extended below the associated eye 144 into one of the holes 140 in the channel 132 and is preferably removably seated in a socket 158 in the base wall 102 and is thereby grounded as indicated at 160 (Fig. 16). The other terminal post 156 is welded as at 164 to an electric terminal 166 insulated at 168 from and anchored at 170 to the casing body 32.

Figure 1:
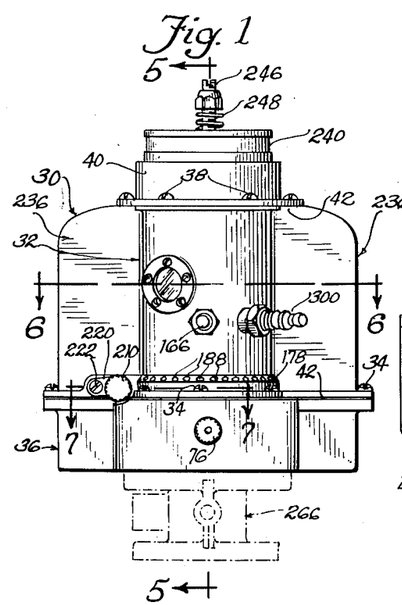
Fig. 1 is a front elevational view of a carburetor constructed in accordance with one form of my invention.
Figure 2:
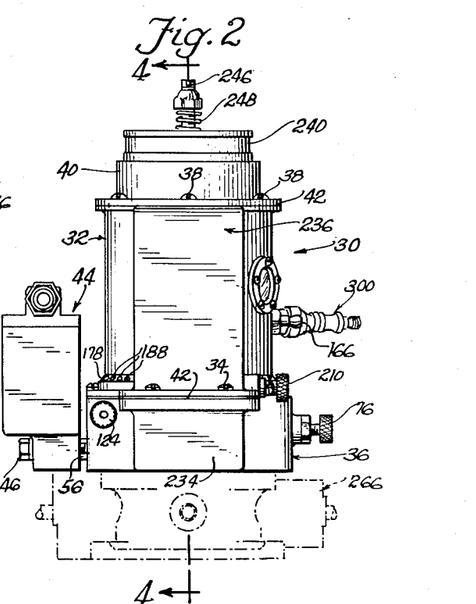
Fig. 2 is a left side elevational view of the same.
Figure 3:
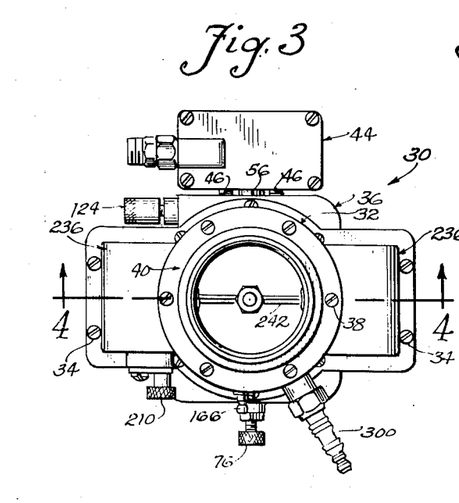
Fig. 3 is the top plan view of the carburetor as shown in Fig. 1.
Figures 4, 12, 13:
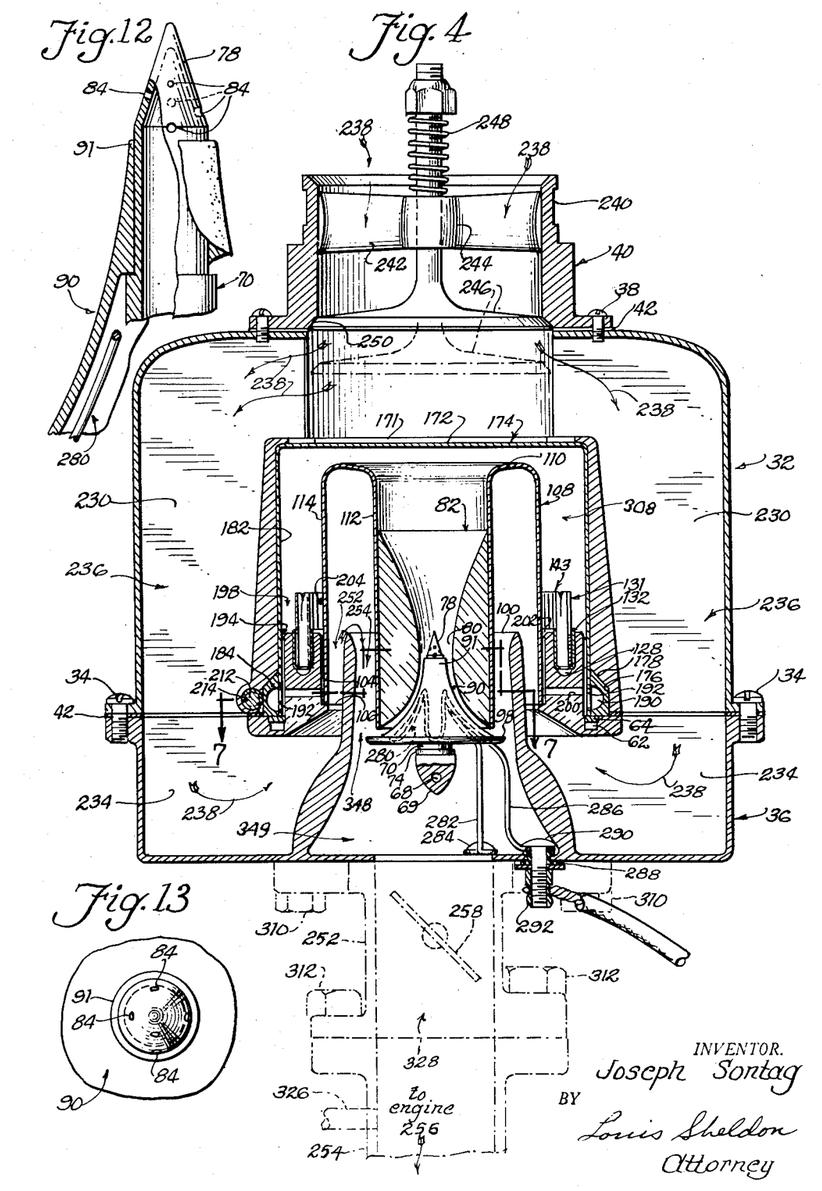
Fig. 4 is an enlarged sectional view taken as indicated by the lines 4—4 in Figs. 2 and 6.
Fig. 12 is an enlarged fragmentary view, partly in section and partly in elevation, taken as indicated by the line 12—12 in Fig. 5.
Fig. 13 is a top plan view of the jet appearing in Fig. 12.
Figures 5, 8, 9, 10, 11:
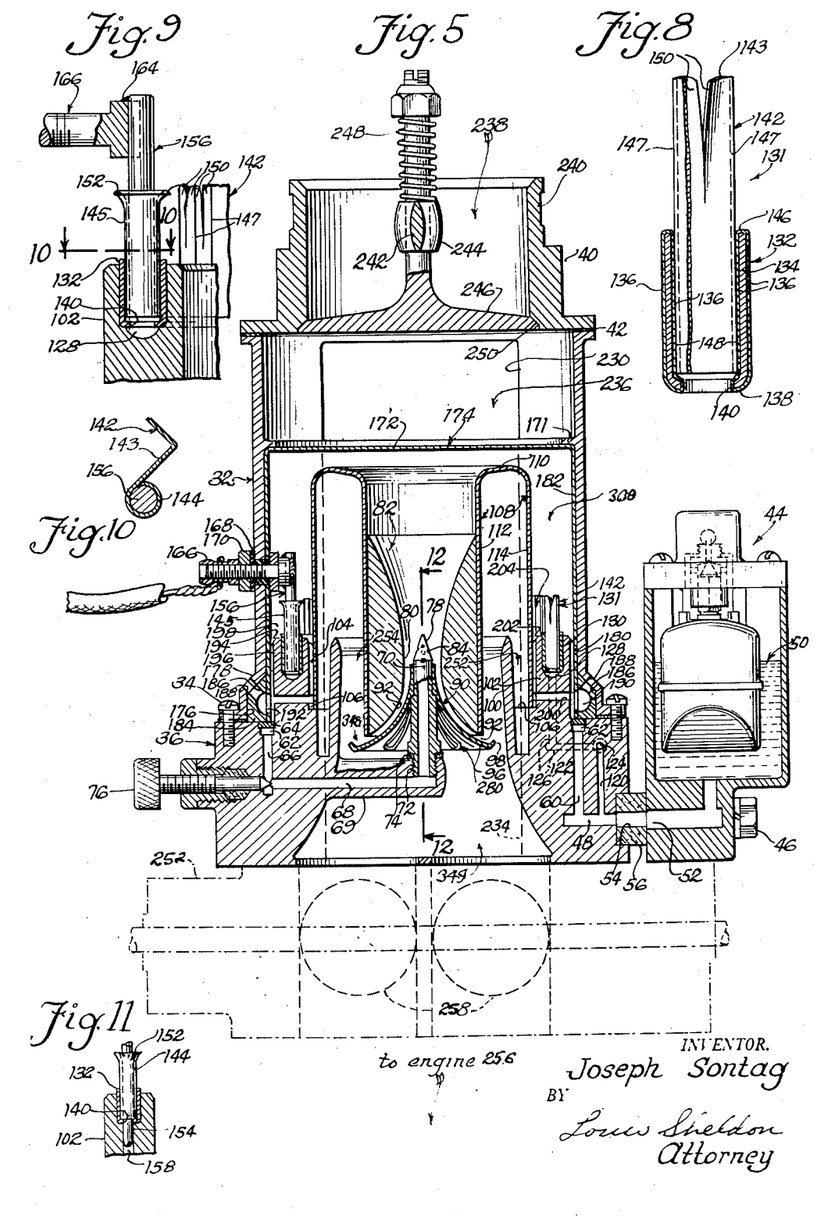
Figs. 5 and 6 are enlarged sectional views taken as indicated by the lines 5—5 and 6—6, respectively, in Fig. 1.
Fig. 8 is a magnified cross-sectional view of the burner shown on a smaller scale in Fig. 5.
Fig. 9 is an enlarged sectional view taken as indicated by the line 9—9 in Fig. 6.
Fig. 10 is a sectional view taken as indicated by the line 10—10 in Fig. 9.
Fig. 11 is a sectional view through the other end of the burner ring and taken as indicated by the line 11—11 in Fig. 6.

The casing body 32 has, substantially below the top thereof, an inwardly extending annular lip 171 against which the top or dome 172 of an inverted cup liner 174 abuts. Rotatably fitted in an annular recess 176 between the outwardly bulged bottom portion 178 of the body 32 and the lower end portion 180 of the liner wall 182 is a valve ring 184 having an arcuate series of holes 186, certain of which are adapted to communicate to varying extents, as will appear, with an arcuate series of holes 188 located in said bulged portion and communicating with the atmosphere. The holes 186 lead inward to an annular plenum passage 190 in the ring 184, from which atmospheric air is adapted to pass inward through holes 192 in the liner bottom 180 and thus gain access to an annular space 194 between the liner wall 182 and the outer surface 196 of the base wall 102 and thence to the space 198 thereabove (Figs. 4 and 5). The base wall 102 has a plurality of horizontal slots 200 to admit such air also to the spaces at 202 between adjacent ribs 104 and thence to the space 204 thereabove, the spaces 198 and 204 being at opposite sides of the portion of the ribbon 143 projecting above the channel 132.

Figures 6, 7, 14:
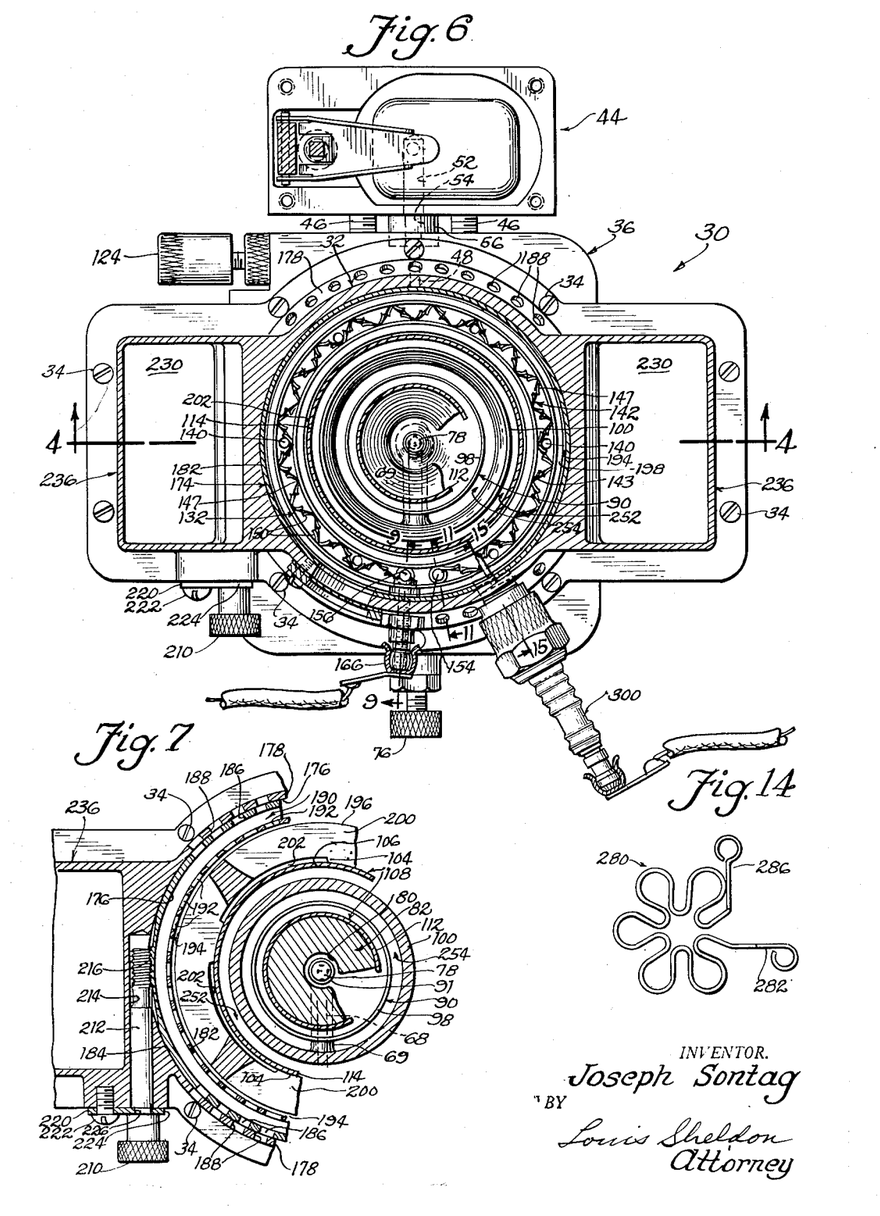
Fig. 7 is a sectional view taken as indicated by the line 7—7 in Fig. 4.
Fig. 14 is a top plan view of a heating element for heating the jet and dispersion members.
Figure 15:
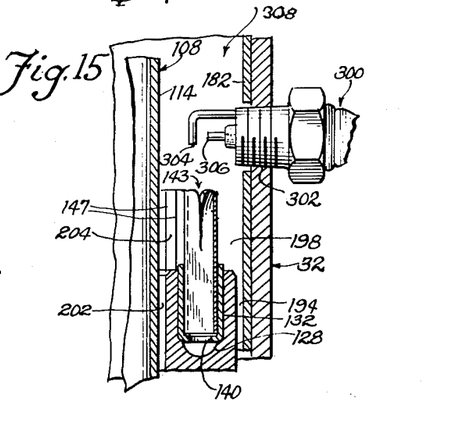
Fig. 15 is an enlarged sectional view taken as indicated by the line 15—15 in Fig. 6.

The purpose of the air entering the spaces 198 and 204 is to provide sufficient oxygen for combustion of fuel in the form of a substantially annular flame at the upwardly projecting portion of the burner ribbon 143. For the purpose of initial setting up of the carburetor to obtain the optimum rate of supply of such air, I have provided adjustment mechanism shown in some detail in Fig. 7. This mechanism comprises a stud 210 having a threaded shank 212 extending freely in an opening 214 in the bottom portion 178 of the carburetor housing body 32, said opening forming a substantially tangential extension of the annular recess 176, said shank coacting with a worm gear thread 216 at the outer side of the adjacent ring 184 in the fashion of a coacting worm and worm gear. The stud 210 is confined to rotary movement as by a keeper 220 secured to the housing as by a screw 222, said keeper being bifurcated, with its arms 224 extending in a circumferential groove 226 in the stud. It is accordingly evident that rotation of the ring 184 in one direction or the other will depend upon the direction of rotation of the stud 210, with the result that the holes 186 in the ring will be brought into greater or less registration with the ports 188 in the bottom 178 of the casing body 32, and thus the rate of flow of oxygen to the spaces 198 and 204 can be regulated. Once the optimum degree of registration is determined following installation of the carburetor on an engine, the setting need not be changed. Accordingly if desired the setting may be made permanent, as by upsetting one of the elements, so that the same cannot thereafter be tampered with.

The body 32 has preferably diametrically opposite ducts 230 connected at 34 with corresponding ducts 234 formed as extensions of the base 36, defining continuous primary air conduits indicated generally at 236. The primary air entering at 238 may come directly from the atmosphere or preferably through an air cleaner (not shown), for the attachment of which the top housing member 40 may be formed with an annular groove 240. The top member 40 may have a bridge 242 affording at its center a vertical bearing 244 for a valve 246 yieldably urged as by spring means 248 to engage the valve seat 250 but adapted to open in response to engine suction. Other suitable valve mechanism may be employed for this purpose.

The rate of flow of the raw fuel 50 through the jet ports 84 is of course determined by the speed with which the burner products of combustion in the Venturi tube throat 80 flow past said ports, and that is determined by the engine suction. It accordingly follows that as the suction in the manifold adapted 252, intake manifold 254 and engine 256 increases, which is of course contingent upon the speed of rotation of the crank shaft, and is controlled by the throttle valve 258, the rate of flow of the air, burner products of combustion and jet fuel will increase.

In a carburetor using a single jet port, the rate of increase of fuel flow by weight would be greater than the rate of increase of air flow by weight. Consequently, at higher engine speeds and accompanying increased engine suction, the fuel-air ratio increases, so that enrichment of the mixture results at higher engine speeds.

To prevent excessive enrichment, and to maintain a substantially constant fuel-air ratio, I may provide the jet or nozzle 70 with a plurality of ports 84 of different diameters arranged at different levels, with the largest lowermost. The sizes of the holes may vary as efficiency of design may dictate. For some installations, a range of about .025" to about .030" in diameter may be suitable. The ports 84 may be arranged in a spiral having a pitch of about 5/16", although a different pitch or other arrangement of ports may be found suitable.

The lowermost jet port 84 is arranged to provide for a fuel flow adequate for idling and low speeds but in and of itself inadequate for higher speeds. As the throttle valve is opened further, the resulting increased suction increases the rate of fuel flow through the lowermost port 84 and raises the fuel level in the jet tube 70, allowing fuel to pass through the next higher port or ports 84 provided to furnish the additional fuel needed for medium and high speeds. If the area of each upper port were not substantially less than the next lower port, this additional fuel might enrich the fuel-air mixture, and this enrichment is of course undesirable. By reducing the port sizes upward, I am able to obtain air-fuel mixtures of substantially the same richness at medium and high speeds as at idling and low speeds.

The desired substantial uniformity of mixture richness may be attained with jet ports of uniform diameter where the nose or tip 78 of the jet tube 70 is tapered to such an extent as to have the effect of sharply altering the throat constriction insofar as the jet ports are concerned, with the result that the constriction is quite substantially and progressively reduced upward from the lowermost to the uppermost port.

Located within and close to the vaporizing cone 90 is an electric resistance heater 280, in the form substantially of a rosette as shown, if desired, one end 282 being grounded as at 284 to the carburetor base 36 (Figs. 4 and 16) and the other end 286 insulated as at 288 from the base and connected as at 290 to a terminal 292 insulated from the base.

A spark plug 300 is grounded at 302 to the casing body 32 and has its points 304 and 306 arranged in the annular space 308 defined by the liner wall 182 and the outer wall 114 of the shell 108 and disposed over and in proximity to the burner ribbon 143.

The carburetor base 36 is adapted to be attached as at 310 to the manifold adapter 252 containing the throttle valve 254 of the internal combustion engine 256. A vacuum controlled switch mechanism shown diagrammatically at 314 (Fig. 16) is preferably provided and may be of any suitable character. It may comprise a switch 316 whose movable arm 318 moves with a diaphragm 320 carried by a cup 322 and influenced by the pressure of the gas 324 communicating through a tube 326 (Figs. 4 and 16) with the interior 328 of the manifold adapter 252 or, if desired, with the upper interior of the engine 256 (as shown).

The operation of the carburetor is as follows: When the engine 256 is at rest, there is no vacuum in the manifold adapter 252 nor in the upper interior of the engine, and hence the vacuum switch 316 (Fig. 16) is closed. When it is desired to start the engine, the driver closes the ignition switch 340, whereupon current from the battery 342 flows through the ignition switch and vacuum switch 316 and heats the burner ribbon 143 and the cone heater 280. Allowing a few seconds after the ignition switch 340 is first closed for the burner ribbon 143 and cone heater 280 to be adequately heated, the operator closes the starter switch 344, so that current flows from the battery 342 through the starter switch to the starter motor 346, whereupon the engine pistons (not shown) move, creating suction in the engine. This suction draws primary air 238 into the carburetor and also draws raw fuel from the lowermost jet port 84, said fuel being vaporized by the cone 90 and then commingling at the base of the cone with the primary air to produce a combustible mixture which is exploded in the engine before the arrival of the products of combustion of the burner, and thus the cone heater prevents the flow of unvaporized fuel into the engine. The suction also draws atmospheric air (as shown in Fig. 5) into the carburetor through the holes 188 and 186, the annular plenum groove 190, the holes 192, annular spaces 194 and 198, and through the slots 200 and annular spaces 202 and 204, thus acting through the spaces 204 and 198 on opposite sides of the burner ribbon 143 to draw fuel 50 from the annular well 128 through the holes 140 in the channel 132 up along and in contact with both sides of the ribbon, including the tongues 150 thereof, said ribbon, being heated, vaporizing the burner fuel. This vaporized burner fuel combines with said atmospheric air to produce a combustible mixture which is ignited by the spark plug 300 (connected by a spark coil 347 in series with the starter switch 344) to produce an annular flame along the top of the ribbon 143, said flame being of substantial "thickness" and being elongated by virtue of the presence of the twisted tongues 150 at the top of the ribbon and being maintained by the additional fuel and air supplied to the burner in response to the engine suction. In response to said suction, the products of said combustion move upward in the space 308, then radially inward over the top 110 of the shell 108, thence downward into the Venturi tube 82. The starter switch 344 is of course held closed until the engine 256 runs of its own accord, but the time required is but a few seconds since the burner flame is created almost immediately after the starter motor 346 starts. The burner products of combustion continue down the Venturi tube 82 and flow past and produce further suction on the jet ports 84. When the engine is at rest, the fuel 50 stands in the jet tube 70 at a level just below the lowermost port 84. This fuel in the jet tube 70 may be heated somewhat by the cone heater wire 280, and the suction causes this fuel to continue rising in the jet tube 70 and spray out through the lowermost port or ports 84 and spread onto and about the cone 90, which, with the heat of the burner products, vaporizes the spurting jet fuel.

The primary air 238, drawn by said engine suction (which opens the primary air valve 246) through the conduits 236, enters the spaces 252 and 254, which are warmed by virtue of the proximity of the shell 108, and commingles turbulently with the combustion products-and-jet fuel mixture at the zone indicated at 348, forming a combustible which is drawn down into the lower interior 349 of the base 36, thence past the throttle valve 258 and into the engine 256 where it is exploded to run the engine. When the engine begins running of its own accord, the driver of course opens the starter switch 344, de-energizing the burner spark plug 300 as well as the starter motor 346, and the engine suction opens the suction-responsive switch 316, de-energizing the burner ring 143 and the cone heater 90. The burner spark plug 300 and burner ring 143 need not again be energized while the engine is running, for the burner flame will of course continue burning while the engine runs and the cone heater 280 also need not be energized while the engine is running, since the function of the cone heater is to provide initial heat to vaporize the initial charge of jet fuel and to prevent the cold parts of the carburetor from unduly cooling the products of combustion from the burner at the beginning.

While the jet fuel passes down in contact with the heated cone, the additional burner fuel maintains the flame. The jet being closer than the flame to the engine, it follows that the air-jet fuel mixture will reach the engine before or at about the time that the products of combustion of the flame reach the jet ports 84. As soon as the air-jet fuel mixture explodes in the engine, the operator opens the starter switch, thus deenergizing the heaters, which are then no longer necessary to be energized, since the flame will furnish the heat necessary for vaporization of the burner fuel, and the heated products of combustion of the flame will furnish the heat necessary to continue the vaporization of the jet fuel.

In the form of the invention above described, separate air supplies are afforded respectively for the burner and for mixing with the hot products of combustion from the burner. In the form shown in Figs. 17 to 23, the construction is modified to provide among other things a single air supply for these two purposes. This device comprises a preferably substantially cylindrical housing body 350 separated by gaskets 352 from and bolted or otherwise suitably united with an air intake valve sleeve 40 and a base 356. It will be noted that in this device no wing conduit 236 nor baffle 172 is employed; instead, air admitted from the sleeve 40 when the valve 246 is open will impinge on the dome 358 of an inverted sheet metal cup 360 and flow downward in the annular space 362 between the upstanding cylindrical wall 364 of the body 350 and the cylindrical wall 366 of the cup. The base 356 has in its upper surface 367 an annular pocket 368. An annular downward projection 370 on the foot 371 of an annular preferably metal burner support 372 preferably tightly seats in the pocket 368, said support having an outer cylindrical surface tightly engaged with the lower inner surface of the cup wall 366.

The base 356 is formed with an annular plenum groove 376 covered by the burner support projection 370, and with an oil duct 378 leading to the bottom of the groove. The head 380 of the burner support 372 is in the form of a trough, connected by a series of necks 381 with the foot 371, and communicating through ducts 382, extending through the necks and the foot, with the plenum groove 376. Tightly seated in the metal trough 380 is a channel member 132 having in its bight an annular series of holes 140, communicating with an annular plenum chamber 388 in the bottom of the trough, and a burner ribbon 143 is seated in the channel member.

The outer wall 390 of a double-walled sleeve 392 is preferably tightly engaged with the inner cylindrical surface 394 of the burner support 372. The outer wall 390 and the cup wall 366 flank the burner support 372 and extend substantially higher than the top of the burner ribbon 143, and are spaced slightly from the walls of the trough 380.

The cup wall 366 may be outwardly beaded slightly as shown at 394 (Figs. 17 and 20) and, between the bead and the top 367 of the base 356, there is located a cylindrical sleevelike valve ring 396 which closely fits and is rotatably slidable about the cup wall rim portion 398. The ring 396 and rim portion 398 have annular series of holes 400 and 402 respectively, adapted to be more or less registered, depending on the rotary adjustment of the ring, to admit more or less air from the annular space 362 to the spaces 404 and 406 between the trough 380 and the walls 366 and 390 and thence to the sides of and over the burner ribbon 143 to support combustion thereat. Access of this air to the inner space 406 is gained through the spaces 408 between the necks 381. Any desirable adjusting mechanism may be employed. For example, it may comprise a screw 410 threaded in the lower part of the housing body wall 364 and having a reduced portion 412 between shoulders 414 adjacent the free end of the screw stem 416, and fitting in a slot 418 in a lug 420 projecting outwardly from the valve ring 396. Clearance should be provided to compensate for the fact that the valve ring and screw move in slightly different directions; however, since the maximum rotation of the ring will be very slight so that the direction of movement of the lug may for all practical purposes be regarded as substantially parallel to the screw axis, the clearance may be very small. Packing (not shown) may be placed about the screw stem 416 to prevent leakage.

The double sleeve 392 has an inner wall 430 connected to the outer wall 390 by an annular bridge 432 spaced below the dome 358 of the inverted cup 360. A sleeve 434 is secured to the inner upper peripheral portion of the base 356 and projects upward into the annular space 436 between said walls. The air admitted pursuant to opening of the valve 246 and by-passing the ring valve 396 enters an annular series of passages 438 (Figs. 17, 19 and 20), separated by the base portions in which the oil duct 378 is located, and passes upward into the space 436 and thence downward between the walls 430 and 434, and then commingles with the burner products of combustion and the vaporized jet oil as will be understood from the above description of the first form of the invention.

The inner wall 430 corresponds to the wall 112 in the first form of the invention, and accordingly carries a Venturi tube 82 into which projects a jet 78 surrounded by a cone 90 in which a heater 280 is disposed, the jet being connected to a tubular lateral base extension 269, all as shown in connection with the first form of the invention. Oil from the float chamber 44 enters the burner oil inlet 442 (Fig. 17) and its flow into the burner duct 378 is controlled at 444 by a needle valve 76, and oil from the float chamber enters the jet inlet 446 and its flow into the duct 448, leading to the jet, is controlled by a needle valve 124. The electrical circuit and the vacuum control therefor included in the form shown in Figs. 1 to 16 may be employed in conjunction with the carburetor shown in Figs. 17 to 23, and operation of the latter will be understood upon reference to the illustration and description of the first carburetor, bearing in mind, of course, that the air supplied to the burner and the air supplied to the burner products of combustion will come from a common intake controlled by the valve 246.

Although the carburetors herein described were designed particularly to supply a long-felt want, namely, to enable oil, kerosene and other liquid fuels of substantially lower volatility than gasoline to operate automobile, truck, tractor and other internal combustion engines, it will be appreciated that such carburetors will operate with gasoline, if emergency should require, and in such event, since the burner will not be necessary, the burner oil needle valve may be adjusted to block passage of gasoline to the burner.

With a jet tip uniformly spaced from the Venturi tube throat, a sharper reduction in port diameter upward may be found suitable to preclude unduly rich mixtures at higher speeds while permitting the proper amount of fuel flow for such speeds.

The cone heater wire may be imbedded in a thin layer of magnesium oxide or other good heat conducting refractory material coating the inner surface of the cone heater, with the wire out of contact with but very close (say about .005″ from) said inner surface.

Various modifications may suggest themselves to those skilled in the art without departing from the spirit of my invention. Hence I do not wish to be restricted to the specific forms shown or uses mentioned, except to the extent indicated in the appended claims, which are to be interpreted as broadly as the state of the art will permit.

I claim:

1. An oil carburetor comprising a casing, an annular burner in said casing, means for supplying oil to said burner, said burner including a substantially annular electrical heating resistor arranged to heat the burner oil, means for supplying air to said burner for supporting combustion of oil thereat, means including a spark plug carried by said casing and arranged adjacent said burner to ignite the oil-air mixture to produce an annular flame extending from said burner, a Venturi tube in said casing, means for conducting the products of combustion from said burner to said tube, a jet having oil discharge holes in the throat of and spaced from said tube, means for supplying oil to said jet, a hollow truncated cone secured to and flaring down from said jet adjacent and below said holes and in closely spaced relation to the bottom of said tube, an electrical heating resistor arranged within said cone to heat said cone, said burner, tube, jet and cone having a common axis, means for supplying air about the base of said cone for commingling with the mixture of said products and the oil from said jet, said casing having an opening for the discharge of the air-products-oil mixture, means for connecting said casing to an internal combustion engine for operating the engine on the air-products-oil mixture, and means responsive to the engine suction for de-energizing said resistors when the engine becomes self-operating.

2. In an oil-powered internal combustion engine system, a storage battery, an ignition switch, a starter switch, a starter motor in series with said starter switch, a sparking device in parallel with said starter motor, a pair of resistors in parallel with each other, an engine-suction-responsive switch which may be closed when the engine is not self-operating and open when the engine is self-operating, said suction-responsive switch being interposed between and in series with said ignition switch and said resistors, a casing to which said sparking device and resistors are grounded, one of said resistors being in the form of a ring in said casing, means for supplying oil and air to said ring, said sparking device being arranged to ignite the mixture of such oil and air to produce an annular flame, means for supplying additional oil at a point remote from said burner ring, means for conducting the products of combustion from said flame to said additional oil, the other resistor being arranged to heat the additional oil and said products of combustion, and means for supplying additional air to the additional oil and products of combustion to produce a combustible mixture subject to suction of the engine, whereby, when said ignition switch is initially closed, said resistors are energized, and when, shortly after the closing of said ignition switch, said starter switch is closed, said starter motor is caused to turn the engine and at the same time said sparking device ignites the oil-air mixture at said burner ring, and when said products-oil-air mixture is exploded in the engine, the engine suction will open said suction-responsive switch and thus de-energize said resistors.

3. A fuel oil carburetor, comprising a casing having a dome, an annular oil burner disposed within said casing, for providing an annular flame, a toroidal member mounted in said casing and including an outer cylindrical wall defining with said casing an annular space in which said burner is disposed, said wall extending upward with said casing a substantial distance above the top of said burner, said member including an inner cylindrical wall spaced from said outer cylindrical wall, said walls being imperforately bridged at the tops thereof, said bridge being spaced below said dome, a Venturi tube secured to and within said inner wall, a jet at the throat of said tube, means providing a downwardly and outwardly flaring surface within and proximate to said tube below its throat, means adjacent said flaring surface for initially heating the same, said casing and toroidal member affording a sinuous passage for conducting the products of combustion from said burner to the upper part of said tube, said casing having an upwardly projecting sleeve between the first mentioned wall and said tube and extending substantially above the bottom of said tube but spaced from the top of said toroidal member, means for conducting air to the space between said sleeve and said first mentioned wall, said air being adapted to pass upward about said sleeve, over said sleeve and downward between said sleeve and said tube where it commingles with the heated products of combustion and the oil discharged from said jet to produce a combustible mixture adapted to enter the manifold of an internal combustion engine when the carburetor is connected to such engine.

4. An oil carburetor, comprising a casing, a Venturi tube mounted in said casing, means for burning oil in said casing and conducting the products of combustion to said tube, a jet mounted in said casing and projecting in said tube and having ports at the throat of and spaced from said tube, a thin hollow frusto-conical member secured at its smaller end to said jet adjacent said ports and extending in closely spaced relation to the lower part of said tube and terminating adjacent the exterior of said tube, means adjacent said frusto-conical member for heating the same, and means providing a passage of air along the exterior of said tube and past the larger end of said frusto-conical member for drawing said products of combustion past said ports into the space between the lower part of said tube and said frusto-conical member to afford a combustible mixture of said air with the heated products of combustion and jet oil when said carburetor is mounted on an internal combustion engine.

5. An oil carburetor comprising a casing, an oil burner mounted in said casing and including an electrical resistor, said burner having a well in which said resistor is positioned, means for supplying oil to said well for contact with said resistor, means for supplying air to said burner, a spark plug for igniting the mixture of said air and the oil vaporized by said resistor, a Venturi tube mounted in said casing, a jet mounted in said casing and projecting into said tube and having discharge ports at the throat of said tube, a frusto-conical sleeve mounted on said jet adjacent said ports and flaring toward an end of said tube and in close proximity to the interior wall of said tube, an electrical resistor for heating said sleeve, means for conducting the products of combustion from said burner to said tube for passage about said ports and into the space between said sleeve and said tube, means for conducting air past the discharge end of said space and commingling said air with the heated products of combustion and oil from said ports to produce a combustible mixture, an electrical circuit including an ignition switch, a starter switch, a starter motor in series with said starter switch, said spark plug being arranged in parallel with said motor and in series with said starter switch, and an engine suction switch between and in series with said ignition switch and said burner resistor, said sleeve heating resistor being in parallel with the first mentioned resistor, said suction switch being closed when the engine connected with said carburetor is driven by said motor and being open when the engine is self-driven, whereby, when said starter switch and suction switch are open, said spark plug and resistors are de-energized.

6. An electrical system for an oil carburetor including an oil burner and a vaporizer for additional oil to be commingled with the products of combustion of the oil burner, said system comprising a source of electric energy, an ignition switch and a motor starter switch in parallel with each other and connected to said source, a motor for turning the crank shaft of an internal combustion engine, said motor being in series with said starter switch, an engine suction switch and an electrical heater resistor for the burner, said resistor in series with said ignition switch, and a second electrical heater resistor for the vaporizer, said second resistor being in series with said suction switch and said ignition switch and in parallel with the first resistor, said suction switch being adapted for connection to the intake manifold of the engine and being closed when the engine is not self-operating and being open when the engine is self-operating.

7. An oil carburetor comprising means for burning oil in a continuous flame, a Venturi tube arranged to receive the products of combustion from said flame, a jet located within said tube and having discharge ports at the throat of said tube, a flared sleeve connected to said jet and extending from said ports in close proximity to the interior wall of said tube, means within said sleeve for heating said sleeve to vaporize the oil from said jet, said products of combustion being adapted to pass said ports and through the space between said sleeve and the interior wall of said tube, and means for commingling air with the heated products of combustion and oil from said jet to produce a combustible mixture adapted to enter the intake manifold of an engine, certain of said ports being spaced apart lengthwise of said tube to preclude the formation of unduly rich combustible mixtures with increase in engine speed.

8. In a fuel oil carburetor, a refractory member having a channel adapted to contain fuel, means for vaporizing oil in said channel so that, in the presence of oxygen, it is ignitable by a spark, said means comprising an electrical resistor ribbon disposed in and extending along and engaging longitudinally spaced portions of the surface of said channel, said ribbon projecting substantially out of said channel, the portion of said resistor projecting out of said channel having a series of kerfs, the portions defining sides of said kerfs being oppositely twisted.

9. An oil carburetor comprising a Venturi tube, and a member disposed in said tube, said member having a plurality of fuel oil jet ports located in the throat of and spaced from and opening toward the inner surface of said tube, said member also having a thin frusto-conical metal skirt flaring and in substantially uniformly closely spaced relation to said surface from the portion of said member adjacent said ports toward and terminating adjacent the discharge end of said tube, and means for supplying fuel oil to said ports, said ports being circumferentially spaced apart so as to spread the oil onto different areas of said skirt.

10. An oil carburetor comprising a Venturi tube, and a member disposed in said tube, said member having a spiral series of fuel oil jet ports located in the throat of and spaced from and opening toward the inner surface of said tube, said member also having a thin frusto-conical metal skirt flaring and in substantially uniformly closely spaced relation to said surface from the portion of said member adjacent said ports toward and terminating adjacent the discharge end of said tube, and means for supplying fuel oil to said ports.

11. An oil carburetor comprising a Venturi tube, and a fuel oil jet member disposed in said tube and having a plurality of jet ports located in the throat of and spaced from and opening toward the inner surface of said tube, said ports being spaced apart axially of said tube, said member having a tip in which said ports are located, said tip being conical with its apex pointing toward the intake end of said tube and farther than its base from the inner surface of said tube.

12. An oil carburetor comprising a Venturi tube, and a fuel oil jet member disposed in said tube and having a plurality of jet ports located in the throat of and spaced from and opening toward the inner surface of said tube, said ports being spaced apart axially of said tube, said ports being progressively more spaced from the inner surface of said tube in the direction of the intake end of said tube.

13. An oil carburetor comprising a Venturi tube, and a fuel oil jet member disposed in said tube and having a plurality of jet ports of uniform diameter located in the throat of and spaced from and opening toward the inner surface of said tube, said ports being spaced apart axially of said tube, said ports being progressively more spaced from the inner surface of said tube in the direction of the intake end of said tube.

References Cited in the file of this patent

UNITED STATES PATENTS

| 1,147,363 | Biddlecombe | July 20, 1915 |
| 1,220,965 | Duvall | Mar. 27, 1917 |
| 1,376,156 | Murphy | Apr. 26, 1921 |
| 1,408,278 | Ensign | Feb. 28, 1922 |
| 1,826,128 | Gibson | Oct. 6, 1931 |
| 1,890,196 | Schramm, et al. | Dec. 6, 1932 |
| 1,979,918 | Wahlmark | Nov. 6, 1934 |
| 2,057,808 | Widegren | Oct. 20, 1936 |
| 2,196,536 | Rector | Apr. 9, 1940 |
| 2,258,486 | Firth et al. | Oct. 7, 1941 |
| 2,552,256 | Cerf | May 8, 1951 |
| 2,573,093 | Burson | Oct. 30, 1951 |
| 2,633,341 | Reistad | Mar. 31, 1953 |

FOREIGN PATENTS

| 124,987 | Austria | Oct. 26, 1931 |
| 176,302 | Great Britain | Feb. 24, 1922 |